March 29, 1949. W. A. CLEGERN 2,465,846
HOOD STRUCTURE FOR AIRCRAFT
ENGINE TURBOSUPERCHARGERS
Filed Dec. 1, 1944 3 Sheets-Sheet 2
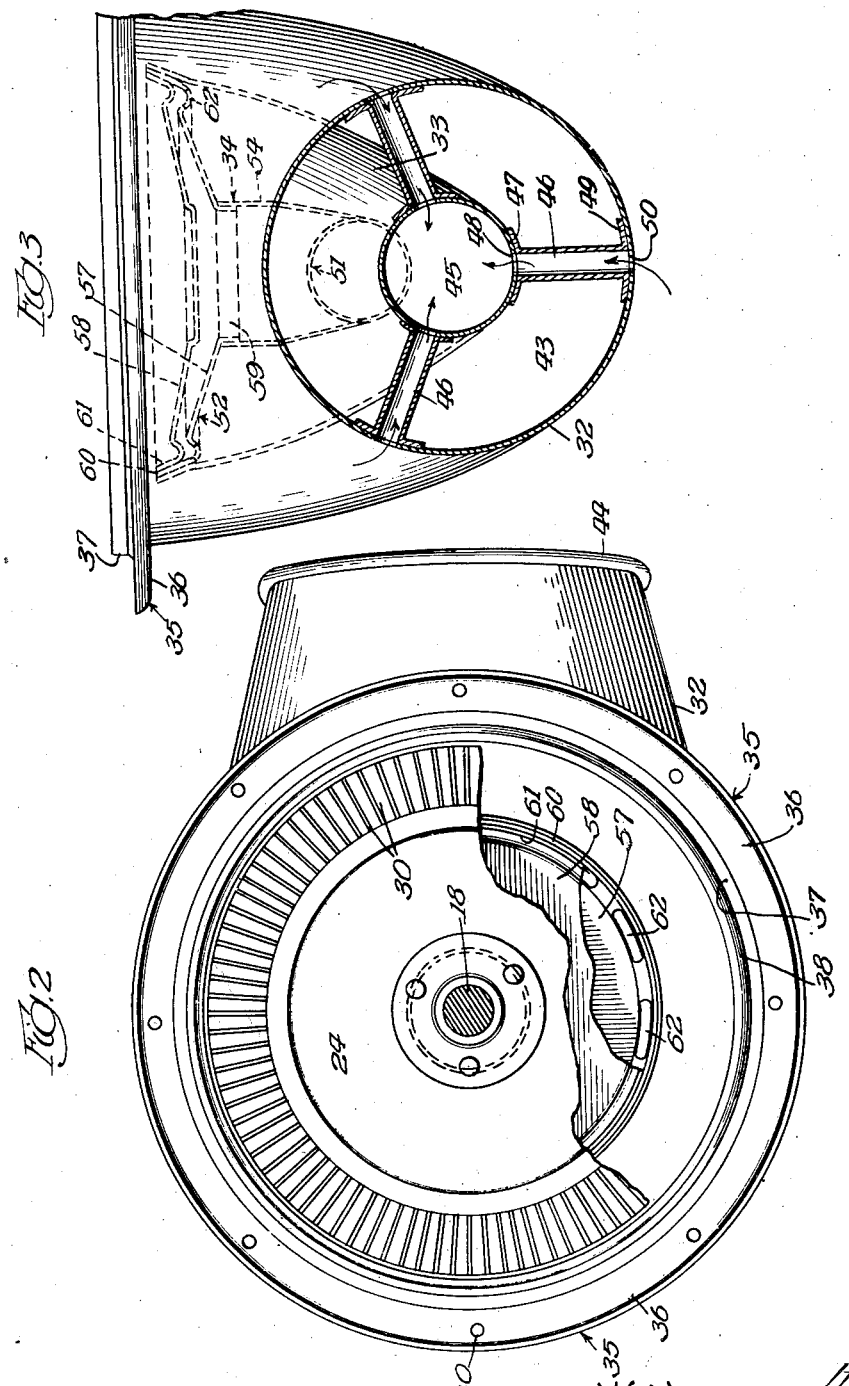
Inventor
William A. Clegern
By: Fred Gerlach
Atty March 29, 1949.  W. A. CLEGERN  2,465,846
HOOD STRUCTURE FOR AIRCRAFT
ENGINE TURBOSUPERCHARGERS
Filed Dec. 1, 1944  3 Sheets-Sheet 3
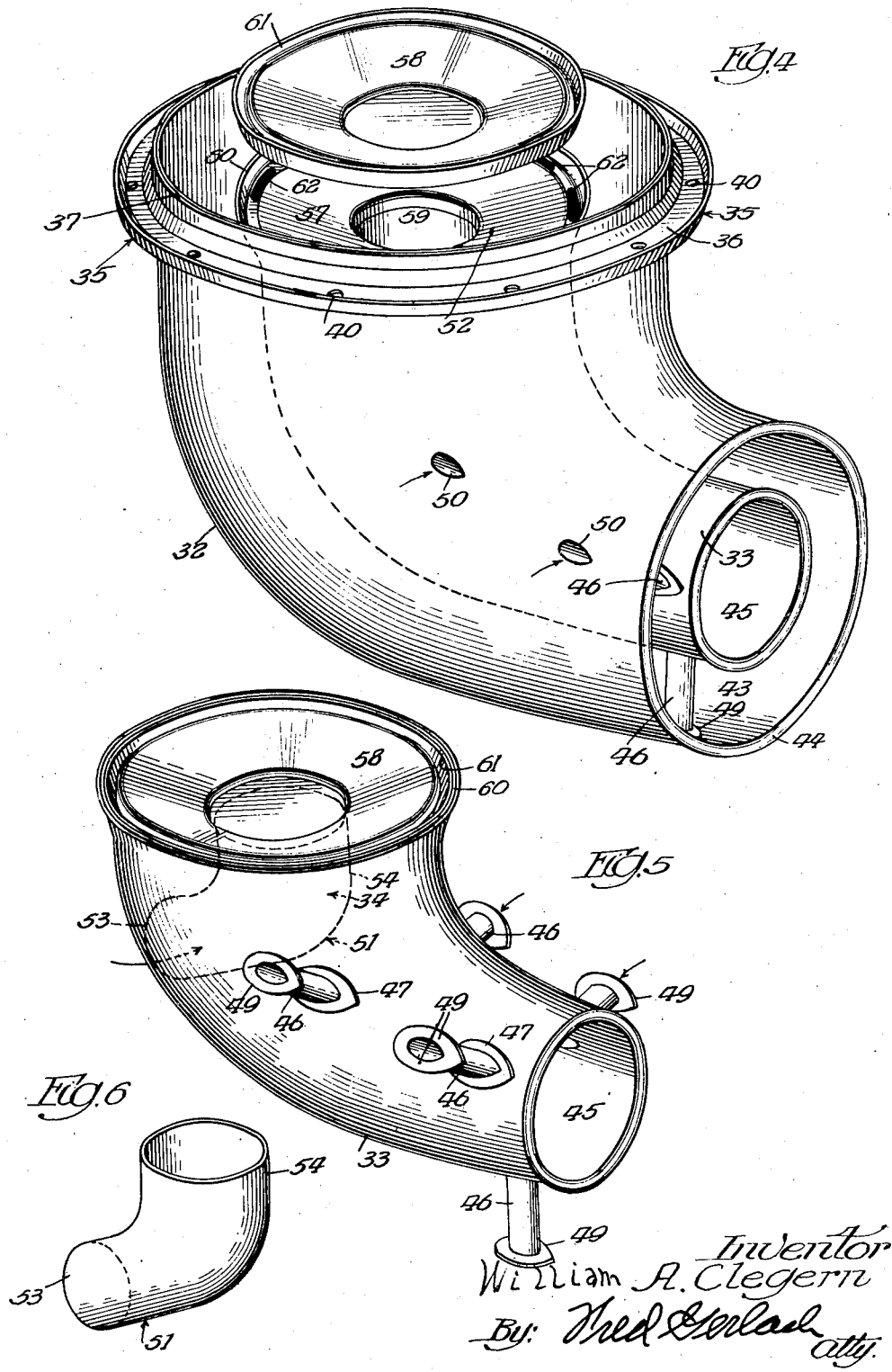

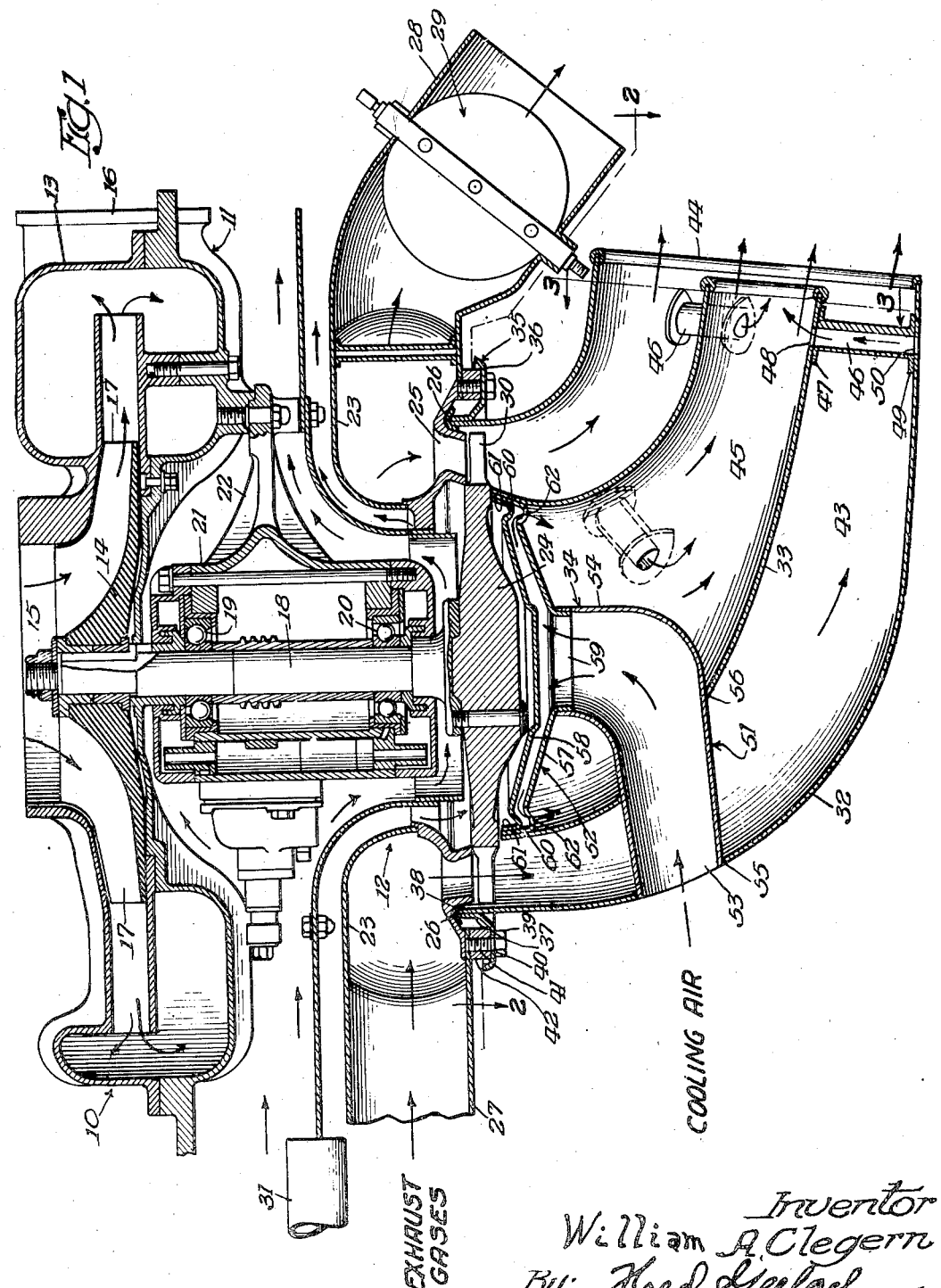

Patented Mar. 29, 1949

2,465,846

UNITED STATES PATENT OFFICE 2,465,846

HOOD STRUCTURE FOR AIRCRAFT ENGINE TURBOSUPERCHARGERS

William A. Clegern, San Diego, Calif., assignor to Consolidated Vultee Aircraft Corporation, San Diego, Calif., a corporation of Delaware Application December 1, 1944, Serial No. 566,118

5 Claims. (Cl. 60—41)

The present invention relates generally to turbosuperchargers for aircraft engines. More particularly the invention relates to that type of aircraft engine turbosupercharger which is disposed in the engine nacelle aft or rearwards of the usual engine mount and as its principal components comprises (1) a supercharger unit which is in the form of a centrifugal air compressor, has the inlet of the housing thereof connected to receive air under atmospheric pressure and the housing outlet connected to the fuel induction system for the engine, and operates in response to drive of its rotary impeller wheel to draw air under atmospheric pressure into the housing via the inlet and to supply air under superatmospheric pressure to the fuel induction system for the engine via the housing outlet; and (2) a subjacent turbine unit which consists of an annular normally horizontal housing with depending nozzles at the bottom wall thereof and means for receiving the engine exhaust gases and a rotary bucket wheel beneath the nozzles and in connected relation with the impeller wheel of the supercharger unit, and operates when the exhaust gases are directed through the nozzles and against the buckets of the bucket wheel to drive the impeller wheel for air compressing purposes.

One object of the invention is to provide in connection with an aircraft engine turbosupercharger of this type a hood structure which is associated with, and in effect forms a part of, the turbine unit and has a twofold purpose in that it serves to exhaust to atmosphere the engine exhaust gases after they have passed through the buckets of the bucket wheel and also to cool in an effective and highly efficient manner the bucket wheel of the turbine unit.

Another object of the invention is to provide an aircraft engine turbosupercharger of the last mentioned character in which the hood structure comprises a depending open ended outer shell having means for attaching its upper end to the bottom wall of the housing of the turbine unit and forming a duct for exhausting to atmosphere the engine exhaust gases after they pass through the buckets of the bucket wheel, a depending open ended inner shell extending through the central portion of the outer shell and forming a cooling air duct leading downwards from beneath the central or hub portion of the bucket wheel of the turbine unit, and means for introducing air from outside the hood structure into the upper end of the inner shell in order that it flows downwardly through the latter and absorbs heat from the bucket wheel.

Another object of the invention is to provide a hood structure equipped turbosupercharger of the type and character last mentioned in which the outer shell is elbow shaped and has the lower end thereof extending rearwards in order that the engine exhaust gases after passing through the exhaust duct in the outer shell will flow rearwards into atmosphere and thus materially reduce aerodynamic drag as well as assist in propulsion of the aircraft in the manner of a propulsion jet.

Another object of the invention is to provide a turbosupercharger of the character last mentioned in which the depending open ended inner shell is elbow shaped and has its lower end extending rearwards within the rearwardly extending lower end of the outer shell in order that the engine exhaust gases flowing through the outer shell to atmosphere pass the lower end of the inner shell and by aspiration produce such suction within the inner shell as to induce or materially augment the flow of cooling air therethrough.

Another object of the invention is to provide a hood structure equipped turbosupercharger of the type under consideration in which the means for introducing into the upper end of the inner shell cooling air from outside the outer shell, embodies an air inlet pipe leading through the front upper portions of the outer and inner shells and a radiator type manifold at the inner end of the air inlet pipe and directly beneath the hub portion of the bucket wheel of the turbine unit, and is so designed and arranged that it together with the inner shell reduces the temperature of the engine exhaust gases in the exhaust duct within the outer shell to a point beneath the ignition temperature or point of the unburnt components of the exhaust gases and hence the exhaust gases emanating from the lower rearwardly extending end of the outer shell are not in such a burning or glowing condition as to be visible at night and constitute a hazard to the safety of the crew of the aircraft, especially if the aircraft is of the military variety.

A further object of the invention is to provide a hood structure equipped turbosupercharger wherein the hood structure embodies a novel sealing means between the upper end of the outer shell and the bottom wall of the housing of the turbine unit and the inner shell is supported in centered relation with the outer shell by way of tubular supports which are of airfoil cross section and serve to establish communication between the interior of the inner shell and the exterior of the outer shell.

A still further object of the invention is to provide in connection with a turbosupercharger a hood structure which effectively and efficiently fulfills its intended purpose, is an improvement upon, and has inherent advantages over previously designed hood structures, and may be manufactured at a low and reasonable cost.

Other objects of the invention and the various advantages and characteristics of the present turbosupercharger for aircraft engines will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a vertical section showing a standard or conventional aircraft engine turbosupercharger having applied thereto a hood structure embodying the invention;

Figure 2 is a horizontal section on the line 2—2 of Figure 1, certain parts being broken away for illustrative purposes;

Figure 3 is a vertical section taken on the line 3—3 of Figure 1 and illustrating the manner in which the tubular supports of airfoil cross section serve to support the inner shell of the hood structure in centered relation with respect to the outer shell and also establish communication between the interior of the inner shell and the exterior of the outer shell;

Figure 4 is a perspective of the hood structure, the upper plate of the radiator type manifold constituting part of the means for introducing exterior cooling air into the upper end of the inner shell being shown in raised position with respect to the lower plate for purposes of illustration;

Figure 5 is a perspective view of the inner shell; and

Figure 6 is a perspective of the air inlet pipe constituting another part of the means for introducing exterior cooling air into the upper end of the inner shell.

The hood structure which is shown in the drawings constitutes the preferred form or embodiment of the invention and is illustrated in connection with, and forms a part of, an aircraft engine turbosupercharger 10. The latter is of standard or conventional design and is located in the engine nacelle (not shown) aft or rearwards of the usual engine mount (also not shown). It serves when in operation to supply air under superatmospheric pressure to the fuel induction system for the engine as well understood in the art and comprises a supercharger unit 11 and a turbine unit 12.

The supercharger unit 11 of the turbosupercharger is in the form of a centrifugal air compressor and normally extends vertically. It is driven by the turbine unit 12 and comprises a housing 13 and an impeller wheel 14. The housing 13 embodies in the central portion of the top wall thereof a circular inlet 15 through which air under atmospheric pressure is introduced or permitted to flow into the central portion of the housing interior. The side wall of the housing 13 of the supercharger unit 11 embodies a radially extending nipple 16 and this constitutes the housing outlet and is connected by a duct (not shown) to the carburetor of the fuel induction system of the engine with which the turbosupercharger is associated. The housing 13 is fixedly secured in any suitable manner within the nacelle for the engine. The impeller wheel 14 is centrally positioned within the housing 13 and embodies an annular series of radially extending vanes 17 on its upper face. It is fixedly connected to the upper end of a vertically extending shaft 18 and operates in response to drive of the shaft to draw air under atmospheric pressure into the housing via the inlet 15 and to supply air under super atmospheric pressure to the fuel induction system via the nipple formed outlet. The central portion of the shaft 18 is rotatably supported by way of an upper ball bearing 19 and a lower ball bearing 20 and these are mounted within a vertically extending substantially cylindrical casing 21. The latter underlies the central portion of the bottom wall of the housing 13 of the supercharger unit and embodies a centrally disposed outwardly projecting lug structure 22 which is fixedly connected to the outer portion of the bottom wall of the housing 13.

The turbine unit 12 of the turbosupercharger 10 is located directly beneath the supercharger unit 11 and receives its operating power from the exhaust gases of the engine. It serves as the driving medium for the impeller wheel of the supercharger unit and comprises a horizontally extending ring shaped or annular housing 23 and a bucket wheel 24. The bottom wall of the housing 23 embodies an annular series of depending nozzles 25 and has on its bottom or under face and directly outwards of the nozzles a downwardly facing annular groove 26 of V-shaped cross section. The front portion of the side wall of the housing 23 of the turbine unit 12 embodies an inlet 27 and this is adapted for connection to the usual tail pipe constituting part of the engine exhaust. The rear portion of the side wall of the housing 23 embodies an exhaust waste pipe 28 which extends rearwards and downwards and has mounted therein a butterfly valve 29. The latter is automatically operated by a regulator (not shown) in order to control the flow of exhaust gases through the depending nozzles 25. The bucket wheel 24 is fixedly connected to the lower end of the shaft 18 and has on the rim portion thereof an annular series of buckets 30 directly beneath the nozzles 25. The engine exhaust gases which flow downwards through the nozzles 25 impinge against the buckets 30 and cause rotation of the bucket wheel and resultant drive of the impeller wheel 14 of the supercharger unit 11. The housing 23 of the turbine unit is fixedly connected in any suitable manner to the housing 13 of the suppercharger unit and hence is not rotatable. A tube 31 leading from a duct in the side of the engine nacelle serves to blast cool air so that it flows around the bearing casing 21 and past the top face of the bucket wheel 24 in order to cool the bearings 19 and 20 and the bucket wheel.

The hood structure is essentially associated with the turbine unit 12 of the supercharger and has a twofold purpose in that it serves to exhaust to atmosphere in a particular manner engine exhaust gases after they have passed the buckets of the bucket wheel and also serves to cool the bucket wheel and the exhaust gases. It is disposed exteriorly of the bottom portion of the nacelle of the engine with which the turbosupercharger is employed and comprises a depending open ended outer shell 32, a depending open ended inner shell 33, and means 34 for introducing air from outside the hood structure into the upper end of the inner shell. All of the parts of the hood structure are formed of stabilized stainless sheet steel or like material that is capable of withstanding high temperature inasmuch as the engine exhaust gases to which the structure is subjected normally have a temperature between 1600 and 1800 degrees Fahrenheit.

The outer shell 32 is elbow-shaped as shown in Figures 1 and 4, and is circular in cross section. It tapers from the upper end thereof to its lower end and is so arranged that its lower end extends rearwards and slightly downwards. The upper end of the outer shell 32 surrounds the annular series of depending nozzles 25 on the bottom wall of the housing 23 of the turbine unit 12 and embodies an externally disposed attaching ring 35. The latter embodies a horizontally extending annular flange 36 and an upwardly extending flange 37, as best shown in Figure 1 of the drawings. The upwardly extending flange 37 is formed integrally with the inner marginal portion of the horizontally extending flange 36 and is welded to the upper end of the outer shell 32. The edges of the upwardly extending flange 37 and the upper end of the outer shell are preferably coplanar and have welded thereto a sealing ring 38 of V-shaped cross section. This sealing ring is shaped conformably to, and fits within, the downwardly facing annular groove 26 that is formed in the bottom wall of the housing 23 and surrounds the nozzles 25. The attaching ring 35 is secured in place by means of bolts 39, the shanks of which extend upwards through holes 40 in the horizontally extending flange 36 and into internally threaded sockets 41 in bosses 42 which are formed integrally with, and depend from, the outer marginal portion of the bottom wall of the housing 23. The height of the upwardly extending flange 37 of the attaching ring 35 is such that when the bolts 39 are tightened to their fullest extent the sealing ring 38 is urged upwards with spring pressure into seated relation with the groove 26. By utilizing an attaching ring as herein described, the upper end of the outer shell 32 is maintained in sealed relation with the bottom wall of the housing 23 and hence outside air is precluded from entering the upper end of the upper shell. The outer shell 32 of the hood structure forms a duct 43 for exhausting to atmosphere the engine exhaust gases after they pass through the buckets of the bucket wheel 24. By reason of the fact that the lower end of the outer shell 32 extends rearwards the engine exhaust gases after passing through the exhaust duct 43 flow rearwards into atmosphere and hence assist in propulsion of the aircraft in the manner of a propulsion jet and any aerodynamic drag resulting therefrom is a minimum. The lower end of the outer shell 32 is preferably reenforced by a bead type reenforcing ring 44 which is welded or otherwise fixedly secured in place.

The inner depending open ended shell 33 extends through the central portion of the outer shell and is elbow-shaped in substantial conformity with the outer shell. It is circular in cross section and forms a cooling air duct 45 leading downwards from a point directly beneath the central or hub portion of the bucket wheel 24 of the turbine unit 12. The upper end of the inner shell 33 terminates directly beneath the portion of the bucket wheel that is inwards of the buckets 30. The inner shell is tapered from the upper end thereof to the lower end and the degree or amount of taper is materially greater than that of the elbow-shaped outer shell 32 in order that the exhaust duct 43 between the inner and outer shells is flared towards its lower or discharge end. The lower end of the inner shell extends rearwards and is centrally disposed with respect to the lower end of the outer shell. As a result of the arrangement of the lower end of the inner shell the engine exhaust gases flowing through the exhaust duct 43 to atmosphere pass the lower end of the inner shell and by aspiration produce such suction within the inner shell as to induce or materially augment the flow of cooling air therethrough. The inner shell 33 is fixed in centered relation with the outer shell by a plurality of tubular supports 46 which extend between the two shells and project substantially radially outwards with respect to the inner shell. The inner ends of the supports 46 have outwardly extending flanges 47 and communicate with the interior of the duct 45 by way of registering holes 48 in the inner shell. The flanges 47 are shaped to fit flatly against, and are welded or otherwise fixedly secured to, the adjacent portions of said inner shell 33. The outer ends of the tubular supports 46 are provided with outwardly extending flanges 49 and are in communication with the exterior of the outer shell by way of registering holes 50 in the outer shell. The flanges 49 fit flatly against, and are welded or otherwise fixedly secured to, the adjacent portions of the outer shell 32. By reason of the fact that the tubular supports 46 establish communication between the exterior of the outer shell and the cool air duct 45 within the inner shell outside air is permitted to flow into the interior of the inner shell in order to assist in cooling the engine exhaust gases as the latter flow through the exhaust duct 43 within the outer shell. The tubular supports 46 are of airfoil cross section in order not to impede or retard the flow of the engine exhaust gases through the duct 43.

The means 34 for introducing cooling air into the upper end of the inner shell 33 from outside the outer shell consists of an air inlet pipe 51, and a radiator type manifold 52. The air inlet pipe 51 is elbow-shaped and embodies a substantially horizontal inlet branch 53 and an upstanding outlet branch 54. The inlet branch 53 extends through registering holes 55 and 56 which are formed respectively in the front upper portions of the outer and inner shells. Since the hood structure is externally disposed with respect to the engine nacelle air, in connection with flight of the aircraft, flows into the inlet pipe 51 via the inlet branch 53. Said branch is welded or otherwise fixedly secured to the portions of the outer and inner shells that define the holes 55 and 56. The outlet branch 54 of the air inlet pipe is positioned substantially centrally in the upper end of the inner shell 33 and has its upper end terminating beneath the top edge of the inner shell as shown in Figure 1.

The radiator type manifold 52 is located at the upper end of the outlet branch 54 of the air inlet pipe 53 and is in communication therewith. It serves in connection with the flow of air therethrough as a cooling or heat absorbing medium for the bucket wheel 24 of the turbine unit 12 and consists of a downwardly dished lower plate 57 and a downwardly dished upper plate 58. The lower plate 57 is centrally apertured and embodies an integral downwardly extending flange 59 which defines the central aperture and fits within, and is welded to, the upper end of the outlet branch 54 of the air inlet pipe 51. The outer marginal portion of the lower plate 57 embodies an integral upwardly extending flange 60 and this, as shown in Figure 1, fits against the upper end of the inner shell 33 and is welded or otherwise fixedly secured thereto. The upper plate 58 is imperforate and overlies, and is spaced above, the lower plate 57. It directly underlies, and is shaped comfortably to, the bottom face of the central or hub portion of the bucket wheel 24 and has at the outer margin thereof an upwardly extending flange 61 which fits within and is welded or otherwise fixedly secured to the upwardly extending flange 60 on the outer marginal portion of the lower plate 57. Such outer marginal portion of the lower plate is provided with an annular series of arcuate slots 62 and these slots permit the air which is introduced into the radiator type manifold 52 via the air inlet pipe 51 to flow into the upper end of the air duct 45 in the inner shell 33. As the air flows outwards through the manifold 52 it cools the manifold and the latter in turn absorbs heat from the bucket wheel 24 and thus cools the latter. The cooling air after passing into the upper end of the duct 45 via the slot 62 in the outer marginal portion of the lower plate of the manifold 52 flows downwards and rearwards through the duct 45 and is exhausted to atmosphere. As the cooling air flows through the duct 45 it cools the inner shell 33 and hence cools or reduces the temperature of the engine exhaust gases flowing through the exhaust duct 43 within the outer shell 32. The air inlet pipe 51, the radiator type manifold 52 and the inner shell 33 are so designed and proportioned that they reduce the temperature of the engine exhaust gases in the exhaust duct 43 to a point beneath the ignition temperature or point of the unburnt components of the exhaust gases and hence the exhaust gases emanating from the lower rearwardly extending end of the outer shell are not in a burning or glowing condition and hence are not visible at night. By reason of the fact that the exhaust duct 43 within the outer shell 32 flares toward the discharge end the exhaust gases in transit through the duct expand and hence their temperature is further reduced. The exhaust gases flowing through the exhaust duct are cooled to a temperature materially less than 1300 degrees Fahrenheit, such temperature being that at which the unburnt components of the exhaust gases tend to ignite or burn.

When the aircraft with which the hood structure equipped turbosupercharger is associated is at the rest on the ground and the engine is started the engine exhaust gases flow into the housing 23 of the turbine unit and a certain portion of the gases flows downwards through the nozzles 25, depending upon the setting or angular position of the butterfly valve 29 in the exhaust waste pipe 15. The portion of the exhaust gases that flows downwards through the nozzles passes the buckets 30 of the bucket wheel and results in conjoint drive of the bucket wheel 24 of the turbine unit and the impeller wheel 14 of the supercharger unit. Drive of the impeller wheel results in air under superatmospheric pressure being delivered to the fuel induction system of the engine. The exhaust gases, after passing the buckets of the turbine wheel, flow through the exhaust duct 43 and are discharged to atmosphere in a rearward direction as hereinbefore pointed out. The exhaust gases as they emanate from the lower end of the outer shell 32 create by aspiration suction within the inner shell 33 and this results in outside cooling air flowing first through the air inlet pipe 51, then outwards through the radiator type manifold 52 and then downwards and rearwards through the duct 45 within the inner shell 33. As the outside cooling air flows through the radiator type manifold 52 it cools the manifold so that the latter in turn absorbs heat from the bucket wheel 24 of the turbine unit 12. One special feature of the present hood structure resides in the fact that it serves effectively and efficiently to effect cooling of the bucket wheel when the aircraft is at rest on the ground. When the aircraft with which the turbosupercharger is associated is in flight a greater quantity of exhaust gases is exhausted through the duct 43 and hence there is an increase in the induced suction within the inner shell and resultantly an increase in the rate of flow of outside cooling air through the inlet pipe 51, the manifold 52 and the inner shell 33. The increase of cooling air through the last mentioned parts or elements is materially augmented as the result of the ramming of air into the inlet pipe 51 due to forward travel of the aircraft. Regardless of whether the aircraft is at rest or in flight the engine exhaust gases flowing through the duct 43 within the outer shell 32 are so cooled that no brightly burning flame plumes emanate from the lower or discharge end of the outer shell. By having the lower end of the outer shell project rearwards aerodynamic drag resulting from the emanation of the exhaust gases from the lower end of the outer shell is reduced to a minimum. Also by having the lower end of the outer shell extend rearwards the exhaust gases are directed aft and form, in effect, a jet propulsion medium which adds to the speed of the aircraft.

The herein described hood structure effectively and efficiently fulfills its intended purpose, is light in weight and may be manufactured at a low and reasonable cost. As a result of the specific design and construction of the broad structure the engine exhaust gases flowing through the outer shell do not develop any back pressure tending to reduce the horse power output of the engine.

The invention is not to be understood as restricted to the details set forth since these may be modified within the scope of the appended claims without departing from the spirit and scope of the invention.

Having thus described the invention what I claim as new and desire to secure by Letters Patent is:

1. A hood structure for an exhaust gas driven turbine having a rotary, bucket type, impeller wheel underlying an annular series of exhaust gas discharge nozzles, said hood structure comprising a tubular outer shell having one end thereof extending around the nozzles and its other end open to atmosphere, and adapted to have the exhaust gases flow therethrough after passing the buckets of the wheel, a tubular inner shell disposed substantially centrally within, and extending longitudinally through, the outer shell and having one end thereof positioned adjacent the central portion of the bucket wheel and its other end terminating adjacent said other end of the outer shell, tubular open-ended supports extending between, and connected to, the two shells and arranged to establish communication between the interior of the inner shell and the exterior of the outer shell, and means for introducing air from outside the outer shell into said one end of the inner shell for flow through said inner shell.

2. A hood structure for attachment to the housing of an exhaust gas driven turbine having a rotary, bucket type, impeller wheel underlying an annular series of exhaust gas discharge nozzles, said hood structure comprising a tubular outer shell having one end thereof extending around the nozzles and its other end open to atmosphere, and adapted to have the exhaust gases flow therethrough after passing the buckets of the wheel, a tubular inner shell disposed substantially centrally within, and extending longitudinally through, the outer shell and having one end thereof positioned adjacent the central portion of the bucket wheel and its other end terminating adjacent said other end of the outer shell, tubular open ended supports of airfoil cross section extending between, and connected to, the two shells and having the inner ends thereof communicating with the interior of the inner shell by way of holes in said inner shell and their outer ends communicating with the exterior of the outer shell by way of holes in said outer shell, and means for introducing air from outside the outer shell into said one end of the inner shell for flow through said inner shell.

3. A hood structure for attachment to the housing of an exhaust gas driven turbine having a rotary, bucket type impeller wheel underlying an annular series of exhaust gas discharge nozzles, said hood structure comprising a depending open ended elbow shaped outer shell having the upper end thereof extending around the nozzles and its lower end open to atmosphere and extending rearwards, and adapted to have the exhaust gases pass therethrough after passing the wheel, a depending open ended elbow shaped inner shell disposed substantially centrally within, and extending longitudinally through, the outer shell and having the upper end thereof positioned adjacent the central portion of the bucket wheel and its lower end extending rearwards and terminating adjacent the lower end of the outer shell, tubular open ended supports of airfoil cross section extending between, and connected to, the two shells and having the inner ends thereof communicating with the interior of the inner shell by way of holes in said inner shell and their outer ends communicating with the exterior of the outer shell by way of holes in said outer shell, and means for introducing air from outside the outer shell into said upper end of said inner shell for flow through said inner shell.

4. A hood structure for attachment to the housing of an exhaust gas driven turbine having a rotary, bucket type, impeller wheel underlying an annular series of exhaust gas discharge nozzles, said hood structure comprising a depending open ended elbow shaped outer shell having the upper end thereof extending around the nozzles and its lower end open to atmosphere and extending rearwards, and adapted to have the exhaust gases flow therethrough after passing the bucket of the wheel, a depending open ended elbow shaped inner shell disposed substantially centrally within, and extending longitudinally through, the outer shell and having the upper end thereof positioned adjacent the central portion of the bucket wheel and its lower end extending rearwards and terminating adjacent the lower end of the outer shell, tubular open ended supports of airfoil cross section extending between and connected to the two shells and having the inner ends thereof communicating with the interior of the inner shell by way of holes in said inner shell and their outer ends communicating with the exterior of the outer shell by way of holes in said outer shell, a hollow heat exchanger type manifold extending completely across and connected to the upper end of the inner shell, having the interior thereof sealed against communication with said central portion of the bucket wheel, and provided at its outer margin with a discharge opening leading downwards to the interior of said inner shell, and an air inlet pipe leading through the front upper portions of the two shells and having the inner end thereof extending upwards and connected to, and in communication with the central portion of the interior of, said manifold.

5. A hood structure for an exhaust gas driven turbine having a rotary, bucket type, impeller wheel underlying an annular series of exhaust gas discharge nozzles, said hood structure comprising a tubular outer shell having one end thereof extending around the nozzles and its other end open to atmosphere, adapted to have the exhaust gases flow therethrough after passing the buckets of the wheel, and tapered from its said one end to its said other end so as to retard the flow of said gases through it, a tubular inner shell disposed substantially centrally within, and extending longitudinally through, the outer shell, having one end thereof positioned adjacent the central portion of the bucket wheel and its other end terminating adjacent said other end of the outer shell, and tapered from its said one end to its said other end to a greater extent than the outer shell, tubular open ended supports extending between, and connected to, the two shells and arranged to establish communication between the interior of the inner shell and the exterior of the outer shell, and means for introducing air from outside the outer shell into said one end of said inner shell for flow through said inner shell.

WILLIAM A. CLEGERN.

REFERENCES CITED

The following references are of record in the file of this patent:

UNITED STATES PATENTS

| Number | Name | Date |
|---|---|---|
| 1,803,665 | Dennis | May 5, 1931 |
| 2,180,168 | Puffer | Nov. 14, 1939 |
| 2,234,757 | Gibson | Mar. 11, 1941 |
| 2,269,181 | Clarke | Jan. 6, 1942 |
| 2,346,128 | Allen | Apr. 11, 1944 |
| 2,370,192 | Reeves | Feb. 27, 1945 |
| 2,370,694 | Smith | Mar. 6, 1945 |
| 2,372,467 | Alford | Mar. 27, 1945 |
| 2,382,387 | Alford | Aug. 14, 1945 |
| 2,395,262 | Forsyth | Feb. 19, 1946 |
| 2,404,334 | Whittle | July 16, 1946 |
| 2,414,841 | Streid | Jan. 28, 1947 |